(12) United States Patent
Ell et al.

(10) Patent No.: US 7,440,214 B1
(45) Date of Patent: Oct. 21, 2008

(54) DISK DRIVE AND METHOD HAVING COST-EFFECTIVE STORAGE OF THE DISK DRIVE'S INTERNAL PROGRAM CODE

(75) Inventors: Travis E. Ell, Foothill Ranch, CA (US); Hanan Kupferman, Diamond Bar, CA (US); Hoa V. Le, Irvine, CA (US); Jonathan V. Nguyen, Laguna Niguel, CA (US); Saied Tamaddon-Dallal, Foothill Ranch, CA (US); Virat Thantrakul, Laguna Niguel, CA (US); Teik Ee Yeo, Trabuco Canyon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 932 days.

(21) Appl. No.: 10/427,484

(22) Filed: Apr. 30, 2003

(51) Int. Cl.
*G11B 15/18* (2006.01)
(52) U.S. Cl. .................................................. 360/69
(58) Field of Classification Search .................. None
See application file for complete search history.

(56) References Cited

U.S. PATENT DOCUMENTS

| | | | | |
|---|---|---|---|---|
| 5,150,339 A | * | 9/1992 | Ueda et al. ............... | 369/30.19 |
| 5,371,792 A | * | 12/1994 | Asai et al. ..................... | 705/59 |
| 5,381,549 A | * | 1/1995 | Tamura ......................... | 713/1 |
| 5,526,328 A | * | 6/1996 | Oshima et al. ........... | 369/13.02 |
| 5,535,355 A | * | 7/1996 | Scales ......................... | 711/101 |
| 5,537,531 A | * | 7/1996 | Suga et al. .................. | 345/543 |
| 5,671,107 A | * | 9/1997 | Mitsuoka et al. ............ | 360/126 |
| 5,694,600 A | * | 12/1997 | Khenson et al. ................ | 713/2 |
| 5,799,145 A | * | 8/1998 | Imai et al. ..................... | 726/19 |

* cited by examiner

Primary Examiner—K. Wong
(74) *Attorney, Agent, or Firm*—Robroy R. Fawcett, Esq.

(57) ABSTRACT

Disclosed is a disk drive having a disk, a masked read-only memory (ROM) device, a reprogrammable nonvolatile memory device, and a microprocessor for executing program code. The disk has a magnetic data storage surface with embedded servo wedges for defining data storage tracks including reserve tracks. The masked ROM device stores program code for implementing a spindle motor controller, program code for implementing a portion of a servo controller for track following along a data storage track, and program code for implementing a portion of a disk controller for controlling writing disk data to and reading disk data from the reserve tracks. The reprogrammable nonvolatile memory device stores data parameters relating to the disk drive's configuration. The reserve tracks store program code for implementing a cache control system for controlling caching of disk data in a cache memory.

13 Claims, 3 Drawing Sheets

DISK DRIVE AND METHOD HAVING COST-EFFECTIVE STORAGE OF THE DISK DRIVE'S INTERNAL PROGRAM CODE

BACKGROUND OF THE INVENTION

1. Field of the Invention

The present invention relates to a magnetic disk drive, and related method, having cost-effective allocation the disk drive's internal program code among a permanent read only memory device, a reprogrammable nonvolatile memory device, and a data storage disk of the disk drive.

2. Description of the Prior Art and Related Information

A typical relatively low-cost magnetic disk drive has an internal microprocessor for controlling disk-drive operations under the direction of program code stored in the disk drive. To begin operation, the disk drive is booted using relatively complex program code stored in an internal memory device. The internal memory device is often a flash memory device that allows a manufacturer to repair or improve the program code during the manufacturing life of a disk drive model. However, a flash memory device is a relatively expensive device which may result in a significant competitive disadvantage in a mass production environment, such as the manufacture of low-cost disk drives.

Accordingly, there exists a need for implementing cost-effective storage of a disk drive's internal program code. The present invention satisfies this need.

SUMMARY OF THE INVENTION

The present invention may be embodied in a disk drive having a disk, a microprocessor, a masked read-only memory (ROM) device, a reprogrammable nonvolatile memory device, and a microprocessor. The disk drive also has a spindle motor, an actuator, a transducer head, and a cache memory. The disk has a magnetic data storage surface with embedded servo wedges for defining data storage tracks including at least one reserve track. The spindle motor is for rotating the magnetic disk, responsive to a spindle control current. The transducer head is for writing disk data to and reading disk data from the magnetic disk. The actuator is for positioning the transducer head over the magnetic data storage surface, responsive to a position control signal. The cache memory is for caching disk data, and the microprocessor is for executing program code. The masked ROM device stores program code for implementing a spindle motor controller that defines the spindle motor current, for implementing a portion of a servo controller for defining the position control signal for track following along a data storage track, and for implementing a portion of a disk controller for controlling writing disk data to and reading disk data from the reserve track(s). The reprogrammable nonvolatile memory device stores data parameters relating to the disk drive's configuration. The reserve track stores program code for implementing a cache control system for controlling caching of disk data in the cache memory.

In more detailed features of the invention, the data storage capacity of the disk drive may be greater than 40 gigabytes, the data storage capacity of the masked ROM device may be less than or equal to 32 kilobytes, and the data storage capacity of the reprogrammable nonvolatile memory device may be less than or equal to 2 kilobytes. Alternatively, the data storage capacity of the disk drive may be greater than 80 gigabytes, and the data storage capacity of the masked ROM device may be less than or equal to 64 kilobytes.

In other more detailed features of the invention, the data parameters relating to the disk drive's configuration may include servo and spindle operating parameters such as the rotation rate of the magnetic disk. The transducer head may include a read head and a write head, and the data parameters relating to the disk drive's configuration may include an offset between the read head and the write head. The data parameters relating to the disk drive's configuration may include a read channel optimization parameter, or a customer specific parameter. The masked ROM device may further store program code for implementing an interface between the disk drive and a host. The reserve track(s) may store program code for implementing a remaining portion of the servo controller and a remaining portion of the disk controller. Alternatively, the reserve track(s) may store program code for implementing all microprocessor-controlled disk-drive operations after the disk drive has been booted using the program code in the mask ROM device and the parameters stored in the reprogrammable nonvolatile memory device.

The present invention also may be embodied a method for internally booting the disk drive. In the method, the microprocessor executes program code stored in a masked read only memory (ROM) device and reads parameter data stored in a reprogrammable nonvolatile memory device for implementing a spindle motor controller that defines a spindle motor current for causing a spindle motor to rotate a disk having a magnetic data storage surface with embedded servo wedges for defining data storage tracks including reserve tracks. The microprocessor also executes program code stored in the masked ROM device and reads parameter data stored in a reprogrammable nonvolatile memory device for implementing a portion of a servo controller for causing an actuator to position a transducer head during a track following operation along a data storage track. Further, the microprocessor executes program code stored in the masked ROM device and reads parameter data stored in the reprogrammable nonvolatile memory device for implementing a portion of a disk controller for controlling reading disk data from the reserve tracks using the transducer head. The microprocessor may then read and execute program code stored in the reserve tracks for implementing a cache control system for controlling caching of disk data in a cache memory.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
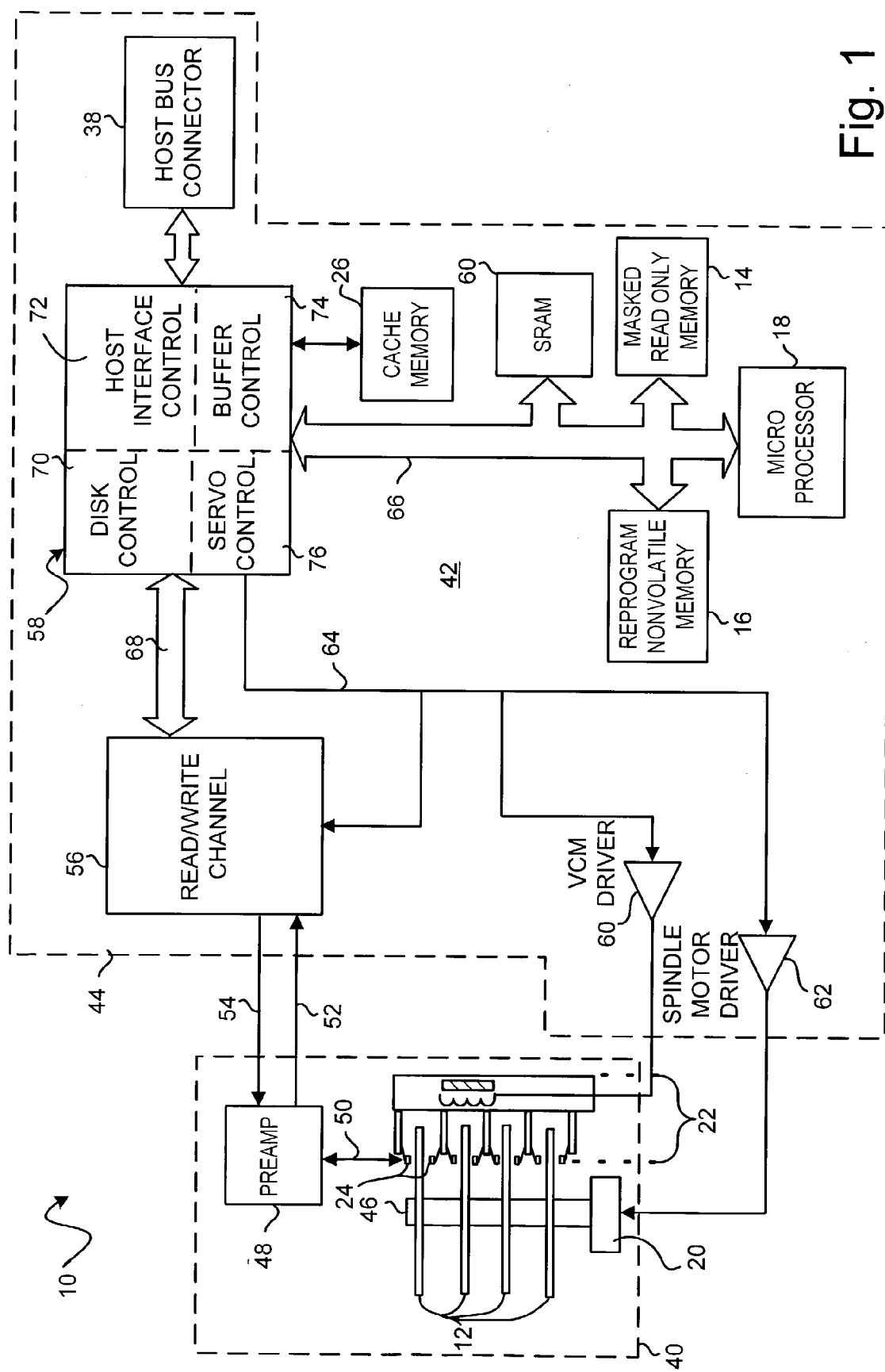
FIG. 1 is a block diagram of a disk drive having cost-effective allocation the disk drive's internal program code among a permanent read only memory device, a reprogrammable nonvolatile memory device, and a data storage disk of the disk drive, according to the present invention.
Figure 2:
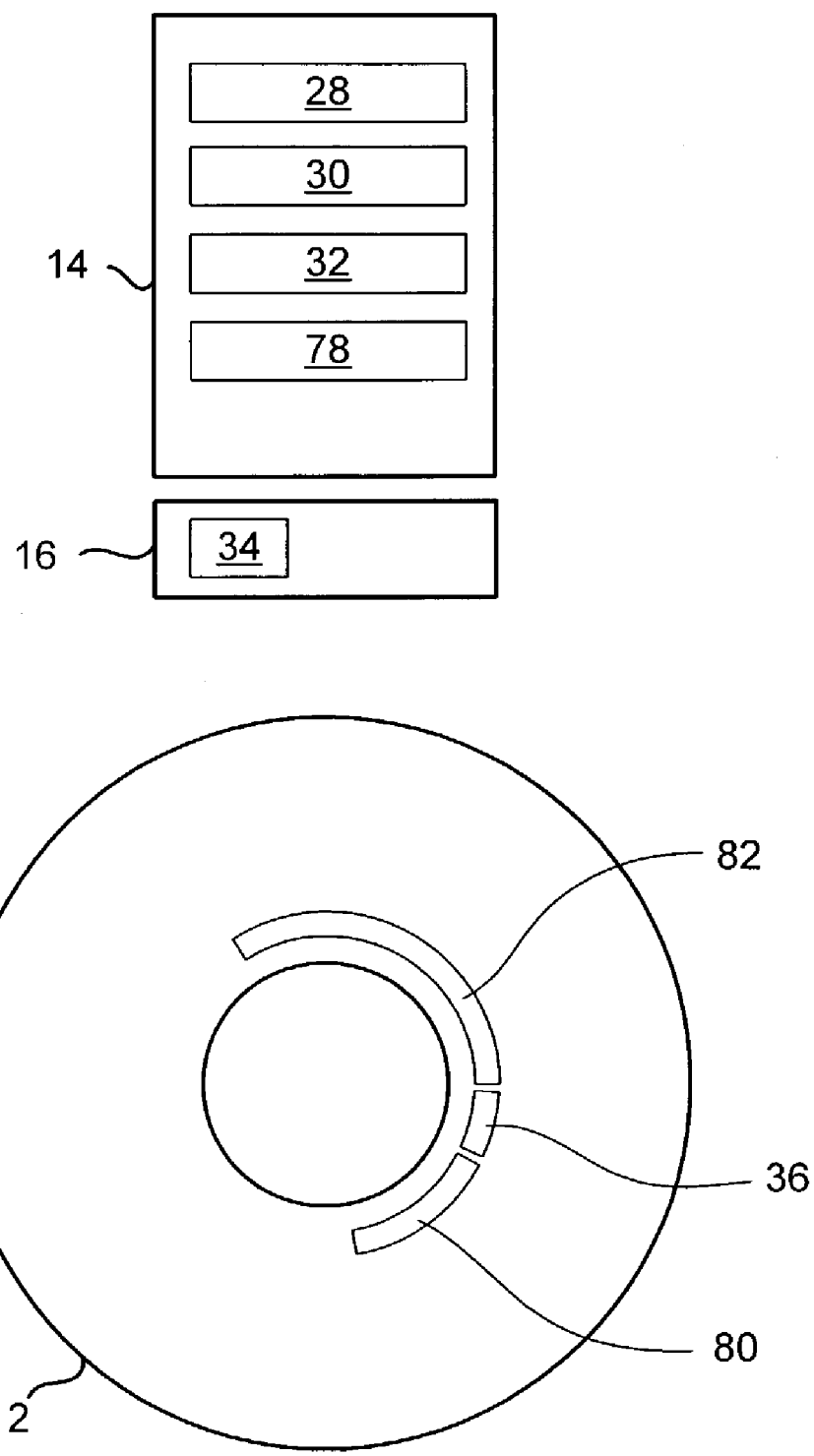
FIG. 2 is a schematic diagram showing allocation of the disk drive's internal program code, according to the present invention.

With reference to FIGS. 1 and 2, the present invention may be embodied in a disk drive 10 having a disk 12, a masked read-only memory (ROM) device 14, a reprogrammable nonvolatile memory device 16, and a microprocessor 18. The disk drive also has a spindle motor 20, an actuator 22, a transducer head 24, and a cache memory 26. The disk has a magnetic data storage surface with embedded servo wedges for defining data storage tracks including one or more reserve tracks. The spindle motor is for rotating the magnetic disk, responsive to a spindle control current. The transducer head is for writing disk data to and reading disk data from the magnetic disk. The actuator is for positioning the transducer head over the magnetic data storage surface, responsive to a position control signal. The cache memory is for caching disk data, and the microprocessor is for executing program code. The masked ROM device stores program code 28 for implementing a spindle motor controller that defines the spindle motor current, program code 30 for implementing a portion of a servo controller for defining the position control signal for track following along a data storage track, and program code 32 for implementing a portion of a disk controller for controlling writing disk data to and reading disk data from the reserve tracks. The reprogrammable nonvolatile memory device stores data parameters 34 relating to the disk drive's configuration. The reserve tracks store program code 36 for implementing a cache control system for controlling caching of disk data in the cache memory.

By way of example, the data storage capacity of the disk drive 10 may be greater than 40 gigabytes, the data storage capacity of the masked ROM device 14 may be less than or equal to 32 kilobytes, and the data storage capacity of the reprogrammable nonvolatile memory device 16 is less than or equal to 2 kilobytes. Alternatively, the data storage capacity of the disk drive 10 is greater than 80 gigabytes, and the data storage capacity of the masked ROM device 14 may be less than or equal to 64 kilobytes.

The masked ROM device 14 has its programming code fixed during its manufacture and is not reprogrammable in the field. The reprogrammable nonvolatile memory device 16 may be a wide variety of reprogrammable devices such as flash memory devices, EEPROM devices, and the like.

The disk drive 10 is connectable to a host (not shown) via host bus connector 38 for the transfer of commands, status and data. One suitable standard for such connection is the Advanced Technology Attachment (ATA) standard presently favored for desktop personal computers. The disk drive 10 comprises a Head/Disk Assembly (HDA) 40, and a control system 42 mounted on a printed circuit board assembly (PCBA) 44. One particular advantage of the present invention is the ability of a manufacturer to use a standard PCBA in a variety of disk drive models. Generic boot program code, 28, 30 and 32, may be stored in the masked ROM 14, and model particular configuration parameters 34, for finding and reading the reserved track(s) on a particular disk drive model, may be stored in the relatively small (2 kilobyte) reprogrammable nonvolatile memory device 16. The production of a standard PCBA, rather than several model specific PCBAs, may provide substantial efficiencies and cost benefits.

The HDA 40 includes one or more disks 12 for data storage, the spindle motor 20 for rapidly spinning each disk 12 (four shown) on a spindle hub 46; and the actuator 22 for swinging the heads 24 in unison over each disk 12. The heads 24 are connected to a preamplifier 48 via a trace assembly 50 for reading and writing data on the disks 12. The preamplifier 48 is connected to channel circuitry in the control system 42 via a read data line 52 and a write data line 54.

The control system 42 comprises a read/write channel 56, a host interface and disk controller (HIDC) 58, a voice coil motor (VCM) driver 60, a spindle motor (SMD) driver 62, the microprocessor 18, a buffer or cache memory 26, a static random access memory (SRAM) device 60, the masked ROM 14, and the reprogrammable nonvolatile memory device 16. A serial bus 64 provides a medium for bi-directional transfer of digital data for programming and monitoring the channel 56, the VCM driver 60, and the SMD 62.

Host initiated operations for reading and writing data stored in the disk drive 10 are executed under control of the microprocessor 18 connected to the HIDC 58 and the memory devices via a bus 66. Program overlay code may be stored on the reserved track(s) of the disks 12 and may be loaded into a random access memory (RAM) device 60 as required for execution.

During disk read and write operations, data transferred by the preamplifier 48 is decoded and encoded by the read/write channel 56. During read operations, the channel 56 decodes data into digital bits transferred on an NRZ bus 68 to the HIDC 58. During write operations, the HIDC provides digital data over the NRZ bus to the channel 56 which encodes the data prior to its transmittal to the preamplifier 48.

The HIDC 58 comprises a disk control circuit 70 for formatting and providing error detection and correction of disk data, a host interface control circuit 72 for responding to commands from a host, and a buffer control circuit 74 for storing data which is transferred between the disks 12 and the host. Collectively, the control circuits in the HIDC 58 provide automated functions which assist the microprocessor 18 in controlling disk operations.

A servo control circuit 76 in the HIDC 56 provides an interface between the microprocessor 18 and the actuator assembly 22 and spindle motor 20. The microprocessor 18 commands logic in the servo control circuit 76 to position the actuator 22 using a VCM driver 60 and to precisely control the rotation of the spindle motor 20 with the SMD 62.

Preferably, the disk drive 10 employs a sampled servo system in which equally spaced servo wedge sectors (sometimes termed "servo wedges") are recorded on each track of each disk 12. Data sectors are recorded in the intervals between the servo sectors on each track. The Servo sectors are sampled at regular intervals to provide servo position information to the microprocessor 18. The servo sectors are received by the channel 56, and are processed by the servo control circuit 76 to provide position information to the microprocessor 18 via the bus 66. Because the program code 36, 80 and 82, stored in the reserve tracks is read using the minimal generic servo controller and disk controller from the masked ROM 14, the reserved track program code may be recorded at the servo sector data rate.

The data parameters 34 relating to the disk drive's configuration may include servo and spindle operating parameters such as the rotation rate of the magnetic disks 12. The transducer head 24 may include a read head and a write head, and the data parameters 34 relating to the disk drive's configuration may include an offset between the read head and the write head. The data parameters 34 relating to the disk drive's configuration also may include a read channel optimization parameter, or a customer specific parameter. The masked ROM device 14 may further store program code 78 for implementing an interface between the disk drive 10 and a host. The reserve track(s) may store program code 80 for implementing a remaining portion of the servo controller and a remaining portion of the disk controller. Alternatively, the reserve track(s) may store program 82 code for implementing all microprocessor-controlled disk-drive operations after the disk drive 10 has been booted using the program code in the mask ROM device 14 and the parameters stored in the reprogrammable nonvolatile memory device 16.

Figure 3:
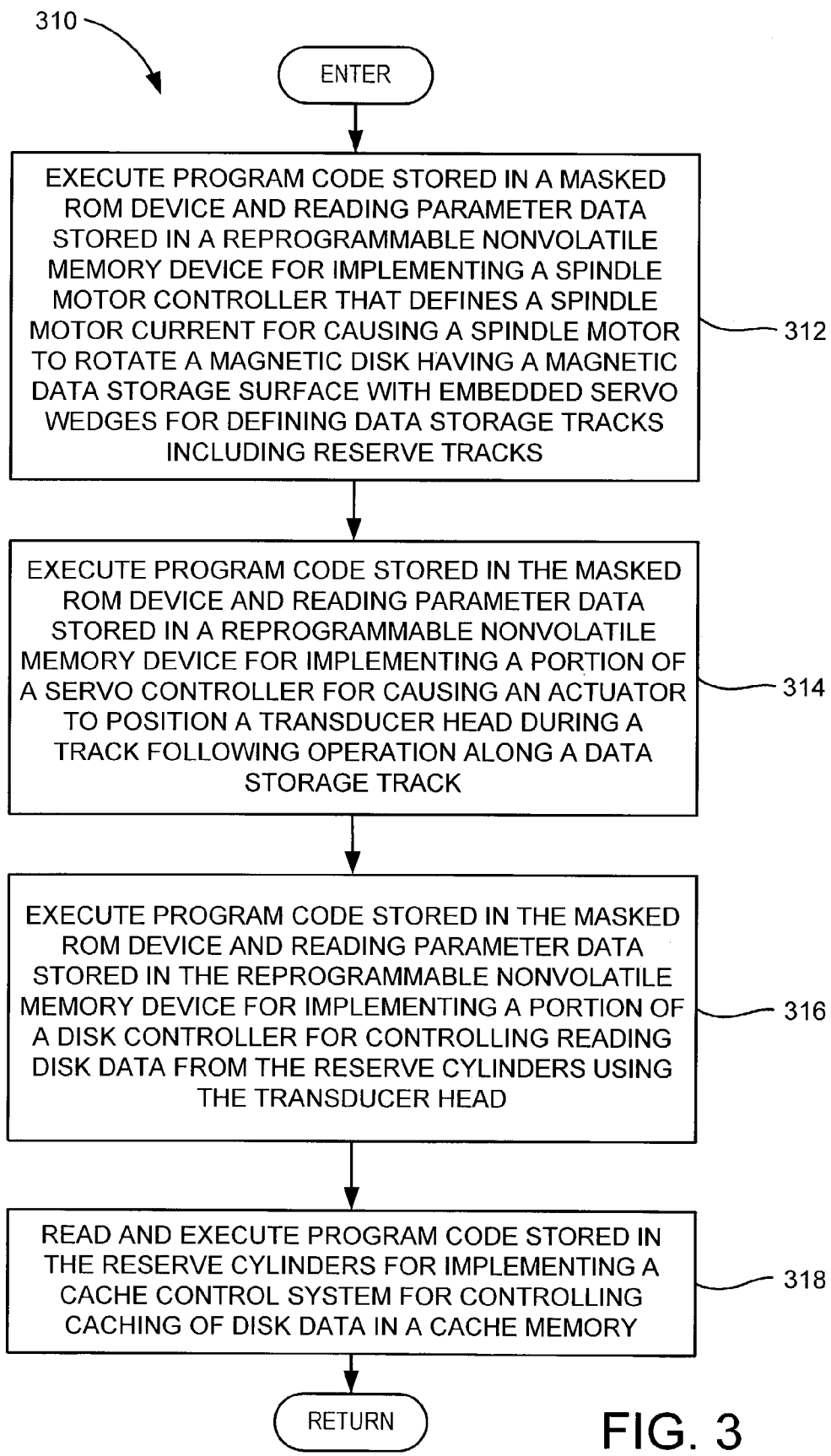
FIG. 3 is a block diagram of a method for booting the disk drive of FIG. 1, according the present invention.

With reference to FIG. 3, the present invention also may be embodied a method 310 for internally booting the disk drive 10. In the method, the microprocessor 18 executes program code stored in a masked read only memory (ROM) device 14 and reads parameter data stored in a reprogrammable nonvolatile memory device 16 for implementing a spindle motor controller that defines a spindle motor current for causing a spindle motor 20 to rotate a disk 12 having a magnetic data storage surface with embedded servo wedges for defining data storage tracks including one or more reserve tracks (step 312). The microprocessor 18 also executes program code 28 stored in the masked ROM device 14 and reads parameter data 34 stored in a reprogrammable nonvolatile memory device 16 for implementing a portion of a servo controller for causing an actuator 22 to position a transducer head 24 during a track following operation along a data storage track (step 314). Further, the microprocessor 18 executes program code 30 stored in the masked ROM device 14 and reads parameter data 34 stored in the reprogrammable nonvolatile memory device 16 for implementing a portion of a disk controller for controlling reading disk data from the reserve track(s) using the transducer head 24 (step 316). The microprocessor 18 may then read and execute program code 36 stored in the reserve tracks for implementing a cache control system for controlling caching of disk data in a cache memory 26 (step 318).

What is claimed is:

1. A disk drive, comprising:
   a disk having a magnetic data storage surface with embedded servo wedges for defining data storage tracks including at least one reserve tracks;
   a spindle motor, responsive to a spindle control current, for rotating the magnetic disk;
   a transducer head for writing disk data to and reading disk data from the magnetic disk;
   an actuator, responsive to a position control signal, for positioning the transducer head over the magnetic data storage surface;
   a cache memory for caching disk data;
   a microprocessor for executing program code;
   a masked read only memory (ROM) device storing program code for implementing a spindle motor controller that defines the spindle motor current, for implementing a portion of a servo controller for defining the position control signal for track following along a data storage track, and for implementing a portion of a disk controller for controlling writing disk data to and reading disk data from the at least one reserve track; and
   a reprogrammable nonvolatile memory device storing data parameters relating to the disk drive's configuration;
   wherein the at least one reserve track stores program code for implementing a cache control system for controlling caching of disk data in the cache memory wherein the data parameters relating to the disk drive's configuration include servo and spindle operating parameters.

2. A disk drive as defined in claim 1, wherein the data storage capacity of the disk drive is greater than 40 gigabytes, the data storage capacity of the masked ROM device is less than or equal to 32 kilobytes, and the data storage capacity of the reprogrammable nonvolatile memory device is less than or equal to 2 kilobytes.

3. A disk drive as defined in claim 1, wherein the data storage capacity of the disk drive is greater than 80 gigabytes, the data storage capacity of the masked ROM device is less than or equal to 64 kilobytes, and the data storage capacity of the reprogrammable nonvolatile memory device is less than or equal to 2 kilobytes.

4. A disk drive as defined in claim 1, wherein the spindle operating parameters includes a rotation rate of the magnetic disk.

5. A disk drive as defined in claim 1, wherein the transducer head includes a read head and a write head, and the data parameters relating to the disk drive's configuration includes an offset between the read head and the write head.

6. A disk drive as defined in claim 1, wherein the data parameters relating to the disk drive's configuration include a read channel optimization parameter.

7. A disk drive as defined in claim 1, wherein the data parameters relating to the disk drive's configuration include a customer specific parameter.

8. A disk drive as defined in claim 1, wherein the masked ROM device further stores program code for implementing an interface between the disk drive and a host.

9. A disk drive as defined in claim 1, wherein the at least one reserve track stores program code for implementing a remaining portion of the servo controller and a remaining portion of the disk controller.

10. A disk drive as defined in claim 1, wherein the at least one reserve track stores program code for implementing all microprocessor-controlled disk-drive operations after the disk drive has been booted using the program code in the mask ROM device and the parameters stored in the reprogrammable nonvolatile memory device.

11. A method for internally booting a disk drive having a microprocessor for executing program code, comprising:
   executing program code stored in a masked read only memory (ROM) device and reading parameter data stored in a reprogrammable nonvolatile memory device for implementing a spindle motor controller that defines a spindle motor current for causing a spindle motor to rotate a magnetic disk having a magnetic data storage surface with embedded servo wedges for defining data storage tracks including at least one reserve track;
   executing program code stored in the masked ROM device and reading parameter data stored in a reprogrammable nonvolatile memory device for implementing a portion of a servo controller for causing an actuator to position a transducer head during a track following operation along a data storage track;
   executing program code stored in the masked ROM device and reading parameter data stored in the reprogrammable nonvolatile memory device for implementing a portion of a disk controller for controlling reading disk data from the at least one reserve track using the transducer head; and
   reading and executing program code stored in the at least one reserve track for implementing a cache control system for controlling caching of disk data in a cache memory.

12. A method for internally booting a disk drive as defined in claim 11, wherein the data storage capacity of the disk drive is greater than 40 gigabytes, the data storage capacity of the masked ROM device is less than or equal to 32 kilobytes, and the data storage capacity of the reprogrammable nonvolatile memory device is less than or equal to 2 kilobytes.

13. A method for internally booting a disk drive as defined in claim 11, wherein the data storage capacity of the disk drive is greater than 80 gigabytes, the data storage capacity of the masked ROM device is less than or equal to 64 kilobytes, and the data storage capacity of the reprogrammable nonvolatile memory device is less than or equal to 2 kilobytes.

* * * * *